(12) United States Patent
Kubiak et al.

(10) Patent No.: US 11,668,659 B2
(45) Date of Patent: Jun. 6, 2023

(54) APPARATUS AND METHOD FOR DETERMINING A DOUBLE IMAGE ANGLE AND/OR A VIEWING ANGLE

(71) Applicant: ISRA SURFACE VISION GMBH, Herten (DE)

(72) Inventors: Rolf Kubiak, Dortmund (DE); Christian Ripperda, Cologne (DE); Paul Weigt, Bochum (DE)

(73) Assignee: ISRA SURFACE VISION GMBH, Herten (DE)

( * ) Notice: Subject to any disclaimer, the term of this patent is extended or adjusted under 35 U.S.C. 154(b) by 1159 days.

(21) Appl. No.: 16/323,165

(22) PCT Filed: Jul. 25, 2017

(86) PCT No.: PCT/EP2017/068803
§ 371 (c)(1),
(2) Date: Feb. 4, 2019

(87) PCT Pub. No.: WO2018/024550
PCT Pub. Date: Feb. 8, 2018

(65) Prior Publication Data
US 2019/0178816 A1 Jun. 13, 2019

(30) Foreign Application Priority Data
Aug. 4, 2016 (DE) .................... 10 2016 114 485.1

(51) Int. Cl.
*G01N 21/958* (2006.01)
*G01N 21/43* (2006.01)
*G02B 27/01* (2006.01)

(52) U.S. Cl.
CPC .......... *G01N 21/958* (2013.01); *G01N 21/43* (2013.01); *G02B 27/0101* (2013.01); *G01N 2021/9586* (2013.01); *G02B 2027/011* (2013.01)

(58) Field of Classification Search
CPC ........ G01N 2021/9586; G01N 21/958; G01N 21/43; G02B 2027/011; G02B 27/0101
See application file for complete search history.

(56) References Cited

U.S. PATENT DOCUMENTS

| 4,249,823 A | 2/1981 | Task |
| 4,837,449 A | 6/1989 | Malthy, Jr. |

(Continued)

FOREIGN PATENT DOCUMENTS

| CN | 102507446 A | 6/2012 |
| CN | 102706899 A | 10/2012 |

(Continued)

OTHER PUBLICATIONS

International Preliminary Report on Patentability issued in International Application No. PCT/EP2017/068803 dated Feb. 5, 2019.

(Continued)

*Primary Examiner* — Dominic J Bologna
*Assistant Examiner* — Amanda Merlino
(74) *Attorney, Agent, or Firm* — McDonnell Boehnen Hulbert & Berghoff LLP

(57) ABSTRACT

The invention concerns an apparatus for determining a secondary image angle (20) of a light source (11) on a transparent object (14). To achieve the objective of building a simple apparatus and to determine the secondary image angle (20) with higher measuring point densities even on transparent objects (14) with large surfaces in a quick, reliable manner with few movements, the apparatus includes an illuminating device (10), which has multiple, simultane- (Continued)

Figure 1:
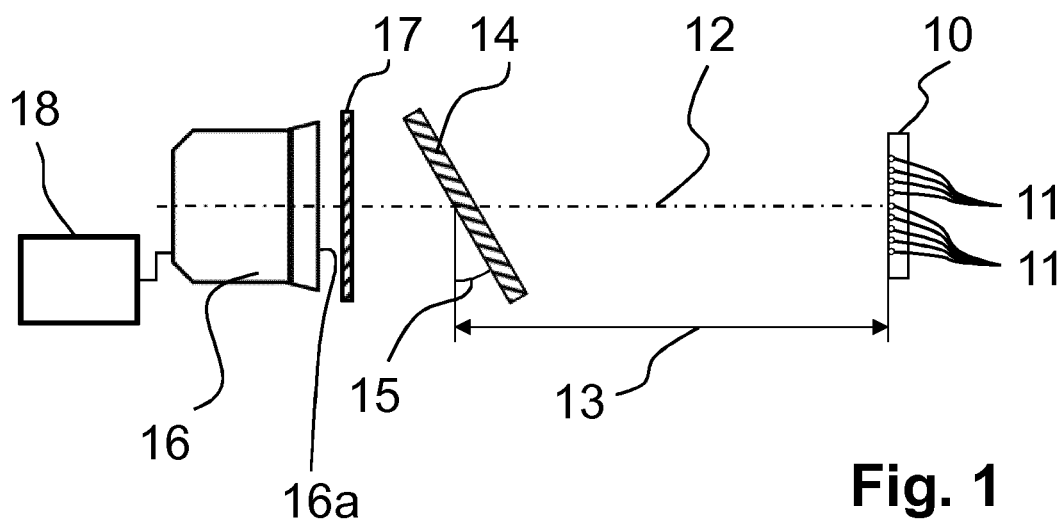

ously illuminating, punctiform light sources (11), a two-dimensional target (16a) with at least one camera (16), whereby at least one camera (16) is set up to capture the positions of a primary image (21a) and a secondary image (21b) of multiple simultaneously illuminating light sources (11) at the same time, whereby the primary image (21) and the secondary image (21b) of one light source (11) are generated on the target by one of the volume elements (14a) of the transparent object illuminated by the light source (11), and an evaluation device (18) is set up to determine the secondary image angle (20) of the respective volume element (14a) of the transparent object (14) based on the positions of the primary image (21a) and the secondary image (21b). Furthermore, a method for determining the secondary image angle is also specified.

18 Claims, 6 Drawing Sheets

(56) References Cited

U.S. PATENT DOCUMENTS

| | | |
|---|---|---|
| 5,446,536 A | 8/1995 | Miyake et al. |
| 5,726,749 A | 3/1998 | Schave |
| 2010/0232677 A1 | 9/2010 | Bartsch et al. |
| 2013/0120560 A1 | 5/2013 | Nguyen |
| 2015/0036120 A1 | 2/2015 | Schulz et al. |
| 2015/0369447 A1 | 12/2015 | Lanchava et al. |
| 2018/0209918 A1* | 7/2018 | Tarantino ............. G01N 21/896 |

FOREIGN PATENT DOCUMENTS

| | | |
|---|---|---|
| CN | 104272091 A | 1/2015 |
| CN | 104969662 A | 10/2015 |
| DE | 20 2013 008 909 U1 | 1/2015 |
| DE | 20 2013 008 910 | 1/2015 |
| DE | 10 2015 014 919 | 5/2016 |
| GB | 2 195 178 | 3/1988 |
| JP | 2016-114362 A | 6/2016 |

OTHER PUBLICATIONS

Regulation No. 43 of the Economic Commission for Europe of the United Nations (UN/ECE) dated Feb. 12, 2014, pp. 1-126.
The International Search Report (ISR) for PCT/EP2017/068803 dated Oct. 6, 2017, pp. 1-3.

* cited by examiner

APPARATUS AND METHOD FOR DETERMINING A DOUBLE IMAGE ANGLE AND/OR A VIEWING ANGLE

CROSS REFERENCE TO RELATED APPLICATIONS

The present application is a U.S. National Phase Application pursuant to 35 U.S.C. § 371 of International Application No. PCT/EP2017/068803 filed Jul. 25, 2017, which claims priority to German Patent Application No. 10 2016 114 485.1 filed Aug. 4, 2016. The entire disclosure contents of these applications are hereby incorporated by reference into the present application.

The invention concerns an apparatus for determining a secondary image angle and/or angle of vision of a light source on a transparent object. In addition, the invention concerns a method for determining a secondary image angle and/or angle of vision.

In accordance with Regulation No. 43 of the United Nations Economic Commission for Europe (UNECE) on uniform provisions concerning safety glazing materials and their installation in vehicles dated Feb. 12, 2014, transparent objects such as windscreens or other panes must be subjected to testing for secondary images. According to the regulation, a secondary image is an image (secondary image) of an object that occurs in addition to the primary, bright image (primary image). In particular, the secondary image is perceived as a disturbing phenomenon at night if the object (for example, the headlights of an approaching vehicle or the light from a street lamp) is very bright in relation to its surroundings.

The secondary image angle $\rho$ (also called the secondary image separation) means the angular distance between the position of the primary and secondary images of an object. The secondary image angle $\rho$ is determined by the geometric properties of the transparent object and irrespective of the position of the viewer and the object. Thus, the secondary image angle $\rho$ describes a property of the transparent object. Its calculation for wedge-shaped transparent objects is specified below as equation F1. In contrast, the angle of vision $\sigma$ describes the angle at which a viewer or a camera perceives a secondary image of an object. Thus, the angle of vision $\sigma$ depends on the position of the viewer or the camera, the position of the light source, and the geometrical properties of the transparent object.

Secondary images are generated by multiple reflections and transmissions of light. In particular, secondary images which occur in transmission, i.e. when the object is viewed through the transparent object, are considered in the context of this invention.

The regulation mentioned above lists methods for testing the secondary image angle. In a known method, a windscreen is positioned at a specified angle of inclination and at a distance to an illuminated plate with an object in the form of a concentric ring and annular hole. The illuminated ring-hole-plate is observed through the windscreen, whereby the observation is made on a horizontal plane, which has a center point of the ring-hole-plate. The ring-hole-plate is viewed successively and individually through each section of the windscreen to be tested. A threshold value for a secondary image angle is exceeded when a secondary image of the hole is shifted over the inner edge of a primary image of the ring at a position in the windscreen and the windscreen is classified as not meeting the quality requirements.

In another known method, a windscreen is placed between a telescope and a collimator. The collimator projects a polar coordinate system in infinity with a bright point in the center. There is a dark point on the optical axis in the focal plane of the telescope. The secondary image angle is read as the distance between two bright points in the polar coordinate system represented through the telescope, whereby the first point represents the primary image and the second bright point represents the secondary image. The secondary image angle can be determined more precisely than in the methods used before due to the simultaneous reproduction of the polar coordinate system.

The testing for secondary images is gaining increasing importance. Secondary images give a poor cosmetic impression of panes. In addition, increased use of integrated Head-Up-Displays in vehicles has resulted in new or more stringent requirements with regard to secondary images in panes. In addition, the cameras used by the assist systems of the vehicle can also be disturbed by a secondary image.

In order to meet the high requirements, the secondary image angle, especially for automotive glass, must be checked on the entire surface with a very high measuring point density, whereby up to two million measuring points are required for each pane. The secondary image angle of a pane in a visible area and corresponding to the quality requirements should not exceed a maximum permissible value.

A disadvantage of the aforementioned testing method in accordance with Regulation No. 43 is that the measurement must be carried out separately at each point of the pane to be tested and this is time consuming. Multiple testing devices must be used simultaneously if many panes need to be tested in a short time.

This results in additional costs. Furthermore, either the pane or the illuminated plate must be moved between two successive measuring points. The high number of movements makes the process complicated, increases the risk of adjustment errors, and causes wear and tear on the moved parts.

The object of this invention is to provide an apparatus for determining secondary image angle and/or angle of vision on a transparent object, which is simple in design and can determine the secondary image and/or angle of vision with high measuring point densities even on transparent objects with large surfaces in a quick and reliable manner. Furthermore, the invention consists of a method for determining a secondary image angle and/or angle of vision on a transparent object, whereby such method can be used to test a transparent object with high density of measuring points in a quick and simple manner with regard to the secondary image angle and/or angle of vision.

The above objective is achieved through an apparatus with the characteristics of claim 1.

The apparatus according to the invention for determining a secondary image angle and/or angle of vision includes:
  an illuminating device, which has multiple, punctiform light sources that are at least partially simultaneously illuminated,
  at least one camera, which is set up to capture the positions of a primary image and a secondary image of multiple simultaneously illuminated light sources on a target at the same time, whereby the primary image and the secondary image of one light source are generated by one volume element of the transparent object from the light source and projected on the target, and
  an evaluation unit, which is set up to determine the secondary image angle and/or the angle of vision of the respective volume element of the transparent object based on the positions of the primary image and the secondary image.

The term volume element used in this invention denotes a three-dimensional section of the transparent object, which stretches over the entire thickness of the transparent object, i.e. from its front side to the rear side. The side of the transparent object facing the illuminating device is described as the front side of the transparent object and the side of the transparent object opposite the front side is described as the rear side. Therefore, the transparent object is composed of many volume elements. In general, the secondary image angle and/or angle of vision occurring at different volume elements of the transparent object may have a different value. Each volume element is illuminated by a single light source from the multiple light sources of the illuminating device. The illuminating device is located in front of the object while the target is arranged behind the transparent object along the light path. The determination of the secondary image angle and/or the angle of vision thus takes place in transmission.

The transparent object should preferentially be a pane, in particular a windscreen. The pane can be partially or completely made of prestressed or laminated glass. Furthermore, the pane can be made of glass, safety glass with plastic, a glass-plastic glazing, a plastic glazing, a laminated safety glass, or an armored glass.

Transparent objects, especially windscreens, are typically arranged at a specific inclination angle for measuring the secondary image angle and/or the angle of vision, whereby the specific inclination angle preferentially corresponds to the later installation position of the transparent object. The light sources and the camera are arranged on a horizontal plane for determining the secondary image angle. The inclination angle of a transparent object is the angle enclosed by a connection line from the upper to the lower edge of the transparent object and a line along a vertical direction. The height of the transparent object is its expansion along the vertical direction. The transparent object can be moved relative to the direction of illumination and the target at least in the horizontal direction. For example, the installation position of a windscreen when testing the secondary image or angle of vision, especially its inclination angle, is specified as the windscreen is meant to be installed in a vehicle. In this case, the horizontal level is parallel to the level of the base of the vehicle.

The target can be formed by a recording surface (such as a film, a CCD chip or a CMOS chip) or image sensor of at least one camera so that the camera directly captures the primary and secondary image. A shield or a similar two-dimensional imaging surface can also be used as a target, whereby the primary and secondary images of the light sources are projected on the shield or similar two-dimensional imaging surface. In this case, at least one camera captures the primary and secondary images from the imaging surface.

The apparatus according to the invention can be used to simultaneously determine the secondary image angle and/or inclination angle for many volume elements, namely for each volume element which is illuminated by the light sources, without needing to move the transparent object relative to the illuminating device and the target. The secondary image and/or angle of vision of a single volume element associated with the optical path of the light and through which the light of the respective light source passes is recorded, whereby the secondary image generation of different volume elements is simultaneously determined by means of different light sources. Thus, the time required for quality control of the transparent object is significantly shortened.

The positions of the primary and secondary image of the illuminating light sources are recorded on the target preferentially in two-dimensional mode. Thus, each position has a horizontal and a vertical component. The target is preferentially oriented perpendicular to the horizontal plane of the light path from the light source to the target.

To determine the secondary image angle and/or angle of vision of a volume element, the separation of the position of the secondary image from the position of the primary image on the target is determined. The secondary image angle and/or angle of vision can be calculated from that with the help of known trigonometric functions because the length of the light path from the light source to the target and the positions of the transparent object in the light path are known. Preferably, it can be sufficient to determine whether the separation of the positions of primary and secondary image are greater than the specified maximum value for separation. If the separation is greater than the maximum value for separation, the transparent object is classified as defective. Thus, the effort required for determining the secondary image angle and angle of vision can be reduced.

In another preferred embodiment, the positions of the primary images and the secondary images of an illuminating device with one row or multiple horizontally juxtaposed rows of multiple vertically arranged light sources are captured simultaneously by the camera. A row of light sources simultaneously illuminating the volume elements over the entire height of the transparent object is especially preferred. This method is used to determine the secondary image angle and/or angle of vision for the volume elements stretching over the entire height of the transparent object in a single step. For a complete analysis of the transparent object, it is then moved in a horizontal direction relative to the illuminating device and the target. Alternatively, the positions of the primary images and the secondary images of an illuminating device with one row or multiple vertically juxtaposed rows of horizontally side by side arranged light sources which simultaneously illuminate volume elements over the entire width of the transparent object can be captured by the camera at the same time.

In another embodiment of the invention, the target has two cameras which are set up to record the positions of the primary image and the secondary image of the simultaneously illuminated light sources at the same time. Thus, the secondary image angle and/or angle of vision can be determined simultaneously for more volume elements of the transparent object. By using multiple cameras, it can be assured that with regard to each light source the direction of observation is essentially perpendicular to the track of the transparent object in a horizontal plane.

In a preferred embodiment of the device according to the invention, the light sources of the illuminating device can be switched on and off separately so that there is sequential recording of the primary and secondary images of all light sources, whereby at each step a subset of multiple light sources are switched on simultaneously and another subset is switched off at the same time, whereby preferentially in at least one subset of two adjacent light sources, one light source is switched on and the other light source is switched off. Thus, the density of the switched on light sources can be controlled and adjusted to the requirements. The accuracy and reliability of determining the secondary image angle and/or angle of vision, especially for adjacent volume elements of the transparent object, can be increased by the incremental recording of the primary and secondary images of all light sources. As a result, a higher measuring point density can be achieved.

The advantage of this embodiment is described below by means of two directly adjacent light sources. In general, in order to determine the secondary image angle and/or angle of vision accurately, it is necessary to assign the light spots occurring on the target to a single light source of the simultaneously illuminated light sources and to determine whether it is a primary image or secondary image of the light source. This assignment or determination is not always unambiguously possible, and therefore causes errors even though the primary and secondary image can be differentiated through their intensity. When only one of the adjacent light sources is switched on in one step and the other light source is switched on in a second step, the assignment to the light source and determination of the type of image can be improved and the accuracy of determination of the secondary image angle and/or angle of vision can be improved.

In different embodiments, each second, third or fourth light source of a row of adjacent light sources in the horizontal and/or vertical direction can be switched on alternately in two, three or four steps, one after another.

It is further preferred that the illuminating device is composed of multiple vertically running rows of light sources, which are arranged next to each other in a horizontal direction, whereby adjacent light sources of two adjacent rows are offset from each other in the horizontal direction. In the vertical direction, directly adjacent light sources of adjacent rows are at a distance (i.e. they are offset from each other), whereby the distance in the vertical direction in an especially preferred embodiment differs from the distance in the horizontal direction, because the horizontal component of the secondary image angle and/or angle of vision is generally smaller than the respective vertical component. Thus, different densities of light sources can be realized for an illuminating device, which are suitable for measuring different transparent objects.

In another advantageous embodiment, the camera records only the vertical component of the positions of the primary image and secondary image of each light source, and the evaluation device uses the recorded vertical components of the positions to determine the secondary image angle and/or angle of vision. This is especially beneficial for windscreens. Their inclination angle is determined by their installation position in a vehicle. Due to their curved form and inclination angle, windscreens generally cause a bigger secondary image angle and/or angle of vision in the vertical direction than in the horizontal direction. By including only the vertical component for determining the secondary image angle and/or angle of vision, the determination can be simplified and accelerated.

Preferentially, directly adjacent and switched on light sources of the illuminating device are controllable such that they have a different light intensity, i.e. directly adjacent light sources illuminate the transparent object with different light intensities (brightness). Alternatively or additionally, directly adjacent and switched on light sources can illuminate the transparent object with different colors (light color). Particularly high measuring point density is possible during a single step with such intensity control. A strong light source illuminates with higher light intensity than an adjacent, weak light source and therefore generates a brighter primary and secondary image than the weak light source. The primary and secondary images can be better assigned to the respective light source by using different light intensities. In an especially preferred embodiment of the invention, more than two adjacent switched on light sources can be controlled such that they have more than two different levels of light intensities. Thus, the measuring point density can be further increased.

Preferentially one subset of the light sources illuminates with a first light color and another subset of the light sources illuminates with a second light color that is different from the first light color, whereby, greatly preferred, two adjacent light sources are illuminated in different colors. The assignment of primary and secondary images by using their color values facilitates higher measuring point densities, as well. It is assumed that the continuous or discontinuous spectra of light sources, i.e. especially in their maximum value, are significantly different for different light colors.

In another advantageous embodiment of the invention, an optical filter is arranged in the light path in front of the at least one camera. A color filter is especially preferred. A polarization filter can be used alternatively or additionally. The optical filter shields the camera from the ambient light because the camera is attuned by the filter precisely to the expected intensities of the primary and secondary image.

The light sources preferentially have a light source density of more than $1/50$ mm, preferentially more than $1/20$ mm, with a special preference for more than $1/5$ mm. This improves measuring accuracy.

In a preferred embodiment of the invention, the illuminating device is arranged on a first side of the transparent object and the target (for example the image sensor in the camera) on the second side of the transparent object, which is opposite to the first side. The transparent object is placed between the illuminating device and camera with the target, and the determination of the secondary image angle is done in transmission. This means that the primary image is a direct image of the light source that is captured through the transparent object without reflections. This results in a comparatively more intense primary image. The intensity of the secondary image is distinctly lower than that of the primary image. As a result, the primary images of many simultaneously illuminated light sources can be differentiated from secondary images easily, quickly, and surely using different intensities.

In an especially preferred embodiment, at least one mirror is placed in the light path before the transparent object. For example, the length of the light path between the illuminating device and the transparent object is 7 m as specified in ECE-R43. The light coming from the illuminating device is reflected by at least one mirror and diverted so that the light path between the illuminating device and transparent object is folded. The space required for the planned light path is significantly reduced with at least one mirror.

LEDs as light source are planned in another embodiment of the invention. Since LEDs are comparatively small light sources, they can be used directly as punctiform light sources. Additional apertures are not required. In addition, LEDs can be controlled and switched on separately with ease. Another advantage is that LEDs can be arranged very close to each other, i.e. with a greater density. They are cost efficient, their energy consumption is low, and they are comparatively more robust, even with repeated switching operations. This reduces the costs and risk of failure for operating the illuminating device. They also generate much less waste heat. This is especially important for high density light sources to avoid thermal problems of the illuminating device in operation. The LEDs can be designed as laser diodes.

Openings of an expanded illuminating device, which are realized with apertures, can also be punctiform light sources, and punctiform light escapes from these openings in the direction of the transparent object. Punctiform openings are preferentially formed by means of switchable polarization filters, most preferentially through liquid crystal elements, whereby their transmittance for light can be controlled separately.

In an embodiment analogous to the ring-hole-plate of ECE-R43 described above, each punctiform light source of the illuminating device can have an illuminated ring that is concentric to the center point of the light source. As a result, testing for multiple light sources can be done easily to ascertain whether the secondary angle meets the requirement of lying within the image of the ring.

A matrix camera is preferentially provided as at least one camera, which records two-dimensional camera images constructed from rows and columns. The positions of the primary and secondary images are captured spatially resolved in a two-dimensional format based on their positions with regard to rows and columns. Preferentially, the at least one camera has an image sensor based on CCD or CMOS technology. Such cameras achieve a high resolution and high recording speed.

The above objective is achieved through a method with the characteristics of claim 7.

In the method according to the invention for determining a secondary image angle and/or angle of vision of a light source on a transparent object, the transparent object is illuminated by means of an illuminating device with multiple, simultaneously illuminating, punctiform light sources, whereby the positions of a primary image and secondary image of multiple simultaneously illuminated light sources are recorded by at least one camera on a two-dimensional target at the same time, wherein the primary image and the secondary image of one light source are generated on the target by the one volume element of the transparent object illuminated by the respective light source, whereby the secondary image angle and/or angle of vision of the respective volume element of the transparent object is determined based on the positions of the primary image and secondary image using an evaluation device.

In an advantageous embodiment of the invention, the light sources of the illuminating device can be switched on and off separately so that there is sequential recording of the primary and secondary images of all light sources, whereby a subset of the multiple light sources are switched on simultaneously and another subset is switched off at the same time, whereby advantageously in at least one subset, one light source is switched on and the other light source is switched off in two adjacent light sources.

The camera preferentially records only the vertical components of the positions of the primary image and secondary image of each light source, and the evaluation device uses only the recorded vertical components of the positions to determine the secondary image angle and/or angle of vision.

In an advantageous embodiment of the method according to the invention, adjacent light sources of the illuminating device are controlled such that they have different brightnesses. In another embodiment, different (for example adjacent) light sources can have different colors (wavelengths) and/or polarizations as an alternate or addition to different brightnesses/intensities.

The methods mentioned and their advantages have been explained above with regard to the invention-related apparatus. Other methods, variations, and advantages explained for the apparatus are also applicable for the method according to the invention.

When determining the secondary image angle and/or angle of vision, the transparent object is preferentially moved relative to the illuminating device and the target. Thus, the secondary image angle and/or angle of vision for multiple volume elements can be determined in multiple successive steps so that it results in quick and complete surface analysis of the transparent object.

In an advantageous embodiment, a second secondary image angle and/or angle of vision for a second ambient parameter (i.e. for a second configuration), which is different from the first ambient parameter, is calculated for at least one volume element of the transparent object based on the first secondary image angle and/or angle of vision determined by measurement under the first ambient parameter (i.e. under a first configuration). For different ambient parameters or configurations, for example, the distance of the transparent object from the target (e.g. the image sensor of the camera, the distance is also described as viewing distance below), the inclination or angle of incidence of the transparent object, and/or the distance of the illuminating device from the transparent object (illuminating distance), the secondary image angle and/or angle of vision can differ for the same volume element. By using this method, additional measurement of the second secondary image angle and/or angle of vision is not required after measuring the first secondary image angle and/or angle of vision under the first ambient parameter (i.e. in the first configuration). Instead, the secondary image angle and/or angle of vision can be calculated for the second ambient parameter (i.e. for the second configuration).

The method according to the invention and the device according to the invention have the advantage that they can extract and separate the fraction of the measured secondary image angle and/or angle of vision resulting from the bending or curvature of the transparent object and from any potential wedge shape of the transparent object. As a result, for example, the process of error analysis can be simplified.

In another embodiment of the method, a fraction of the secondary image angle and/or angle of vision, generated by a bending radius and thickness of the transparent object in the respective volume element, is determined. The determination of this fraction resulting from the curvature of the transparent object is done on the basis that the bending radius and thickness of the transparent object in the respective volume element is known. This is often predefined by the design of the transparent object. For example, the determination can also be carried out on a corresponding volume element of a comparable reference pane, which does not have an additional wedge. This method is used to determine the secondary image and/or angle of vision fraction caused by the thickness and bending radius.

In another embodiment of the method, a fraction of the secondary image angle and/or angle of vision, generated by a wedge angle in the respective volume element of the transparent object, is determined. The wedge angle of the wedge angle element can also be determined. A volume element has a wedge angle if its front and rear sides are not in parallel. Thus, undesirable wedge angles can be identified and their size and distribution over the transparent object can be included as a quality criterion for the tested transparent object.

The calculated wedge angle can also be used to determine the associated second angle of vision of the respective volume element under another ambient parameter. Therefore, the determination of the second angle of vision in this embodiment includes the following steps:

Calculation of a wedge angle of the volume element based on the determined first angle of vision and Calculation of the second angle of vision by using the calculated wedge angle.

The separation of the fractions of the secondary image angle and/or angle of vision determined through measurement and based on the bending radius and the thickness or based on the wedge angle can be utilized to determine the second secondary image angle and/or angle of vision for a second ambient parameter with greater accuracy. The fractions are calculated for the second ambient parameter independent of each other. This simplifies the calculation of the second secondary image angle and/or angle of vision.

In another preferred embodiment, the secondary image angle is determined for at least one volume element of the transparent body based on the angle of vision determined through the measurement of the positions of primary and secondary images and vice versa. Preferentially, the secondary image angle is calculated based on the wedge angle and angle of incidence, whereby the wedge angle and angle of incidence are determined from the angle of vision. The secondary image angle can be determined quickly and without additional measurement.

According to the invention, the determination of individual secondary image angle and/or angle of vision can be done quickly, especially when compared to the speed of a relative movement of the transparent object with respect to the illuminating device and target. For example, the recording of the positions of a primary image and secondary image of multiple, simultaneously illuminated light sources takes less than a millisecond. Currently, the feed rate is about 40 meters per minute in the production of windscreens. Thus, a pane is moved by approximately 0.7 mm in one millisecond. As a result, the determination of individual secondary image angle and/or angle of vision is not impacted by the simultaneous relative movement. This makes the process and control of the full area analysis of the transparent object much easier.

According to the invention, the evaluation device of the apparatus for determining a secondary image angle and/or angle of vision is particularly set up to carry out the above process steps and the aforementioned calculations. For this purpose, the evaluation device with processor is equipped with corresponding hardware and software including memory and bus system.

The invention is explained below by means of embodiments and with reference to figures. All the features described and/or explained with images form the object of this invention, and this is applicable irrespective of the summary of claims or the back references.

Figure 2:
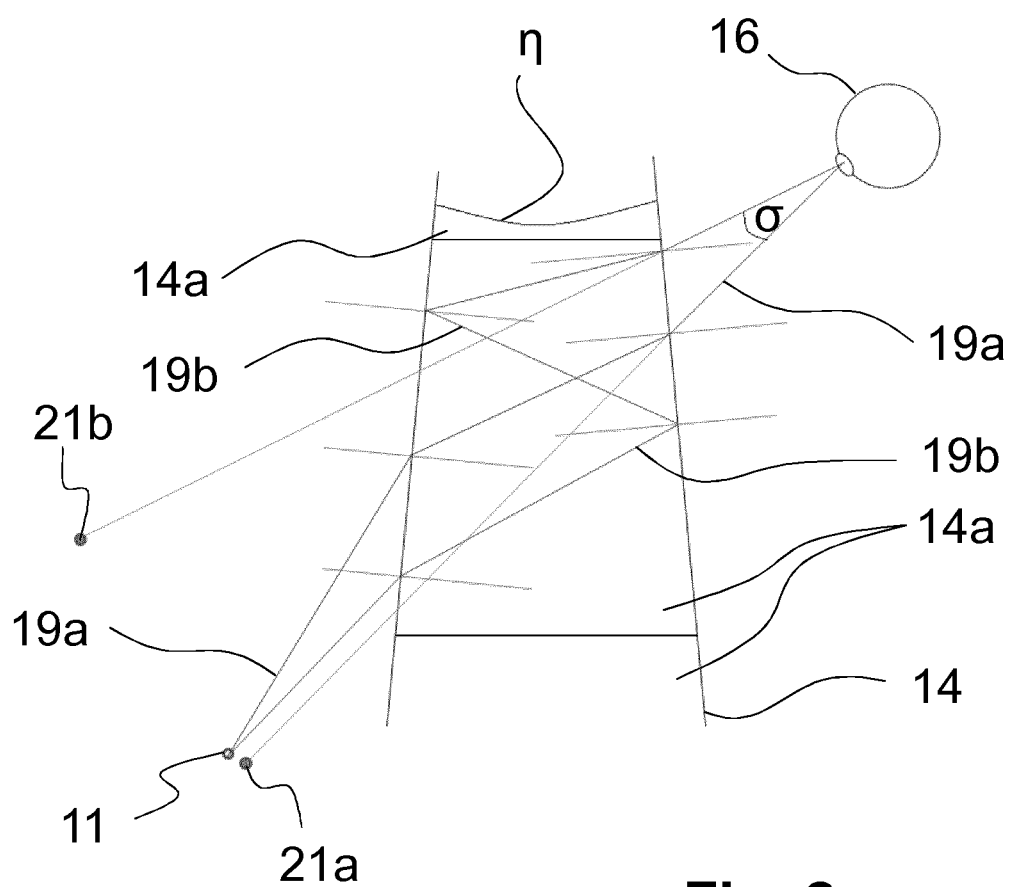
Figure 2A:
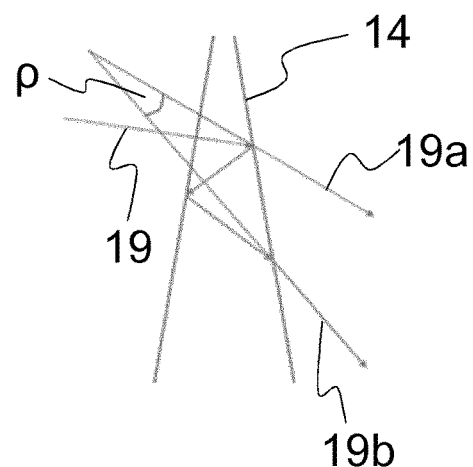
Figure 3:
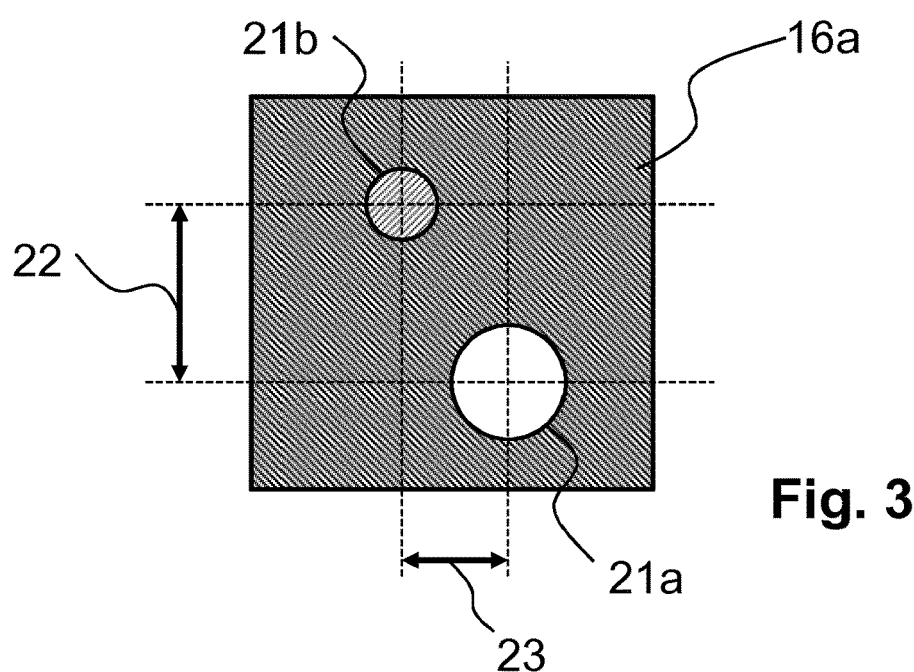
Figure 4:
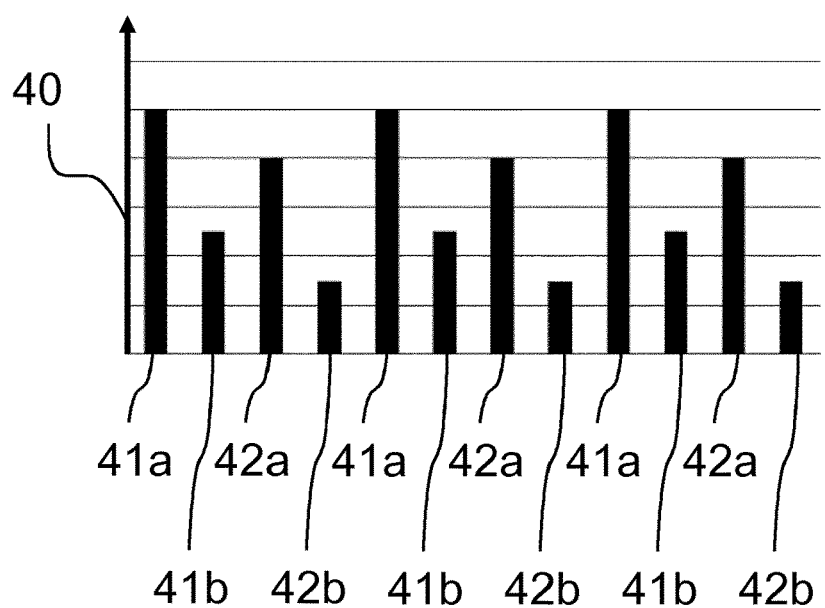
Figure 5:
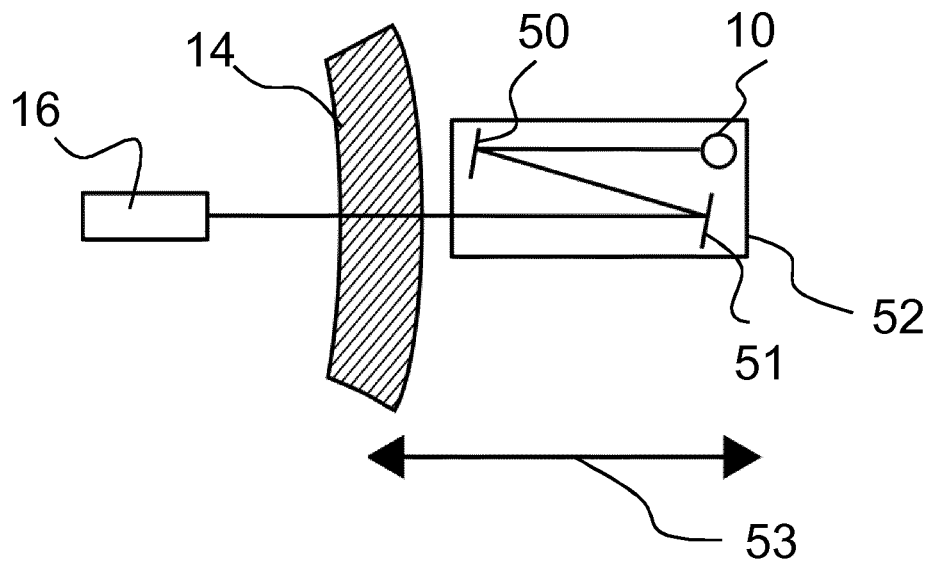
Figure 6:
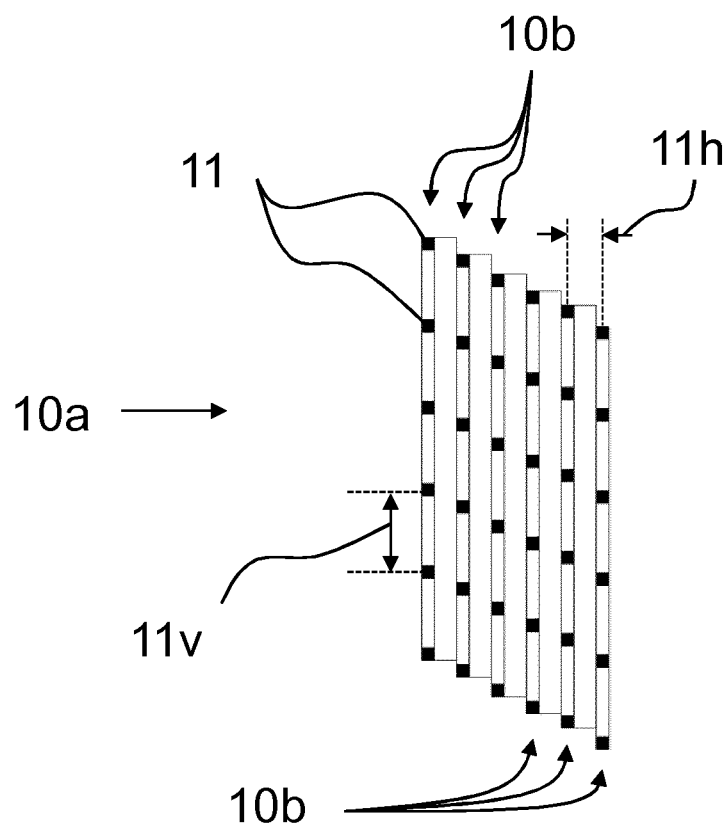
Figure 7:
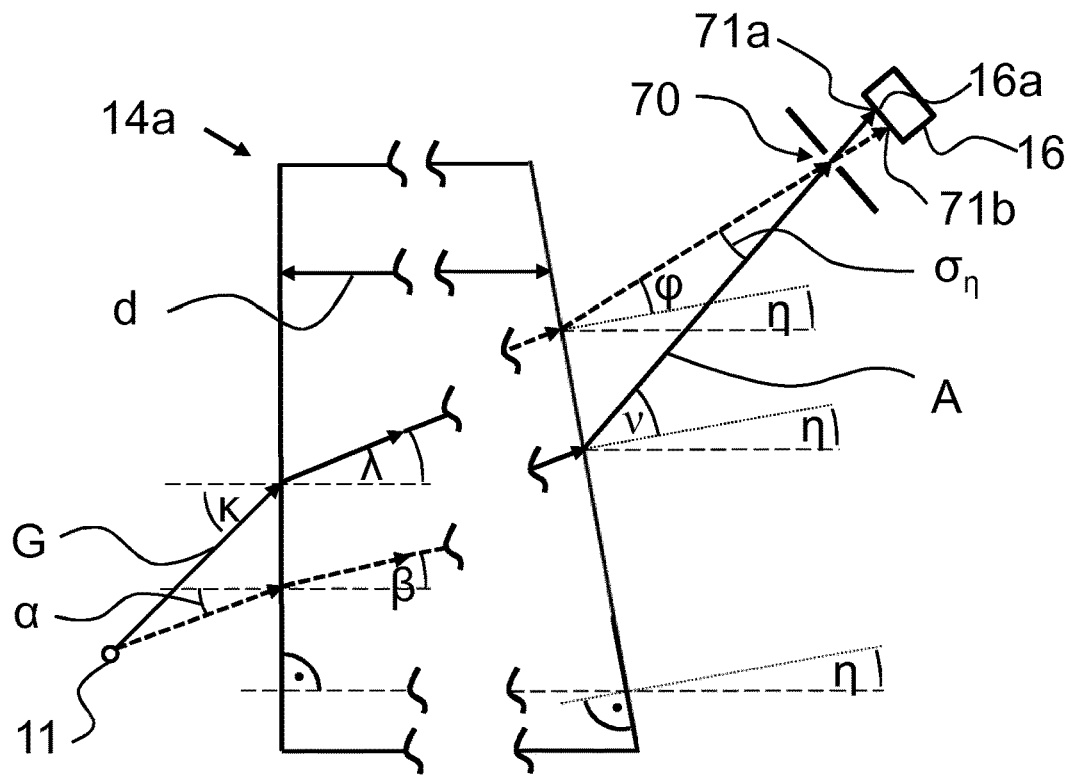
Figure 8:
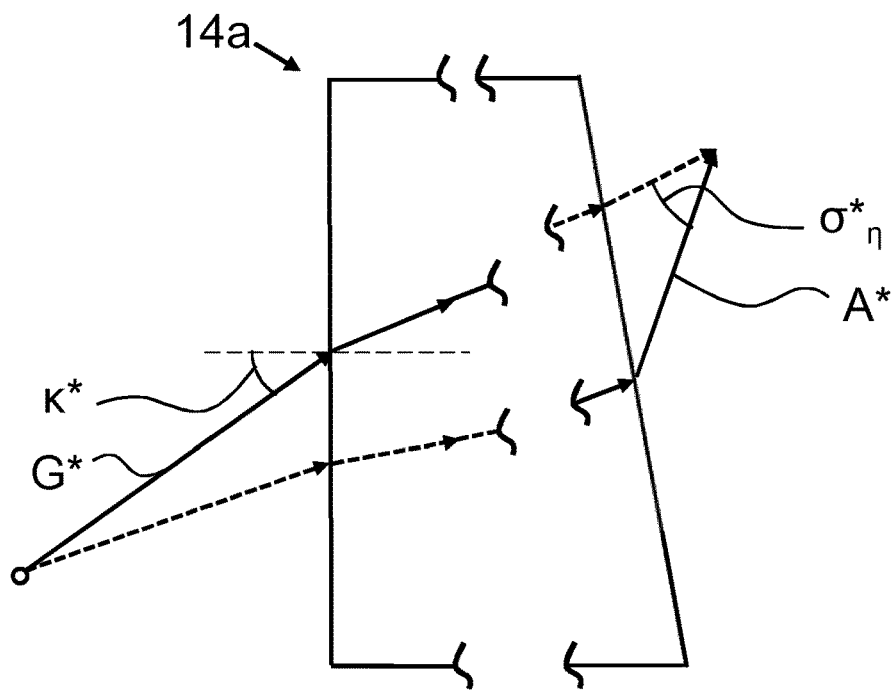
Figure 9:
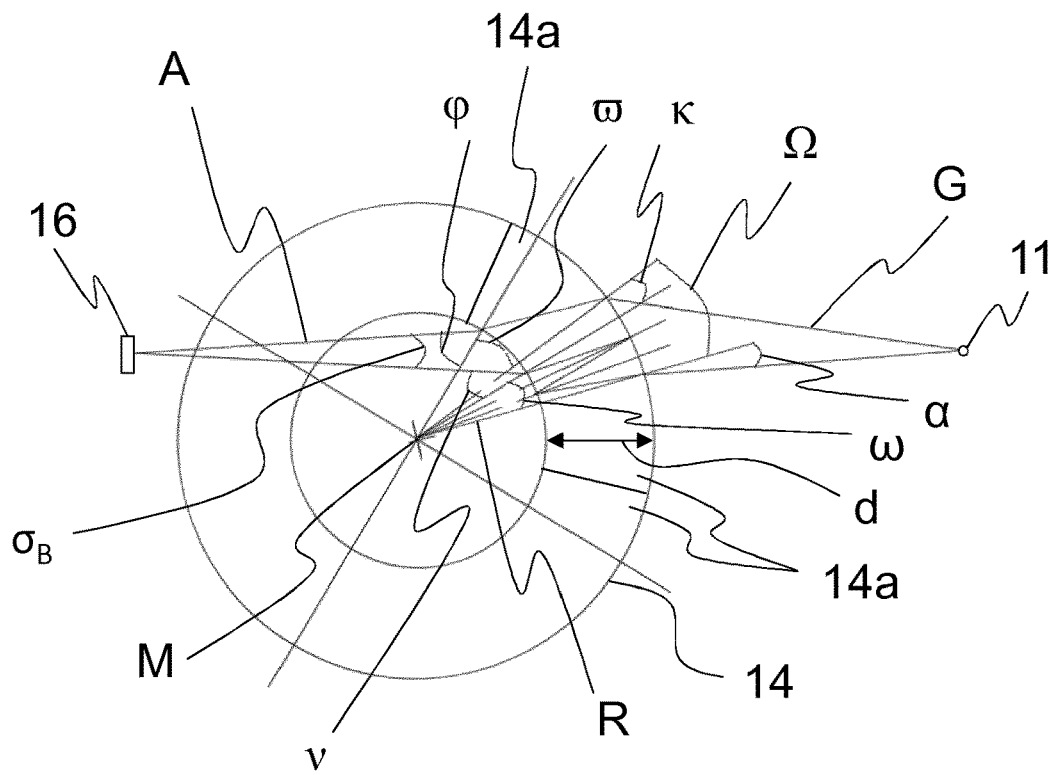
Figure 10:
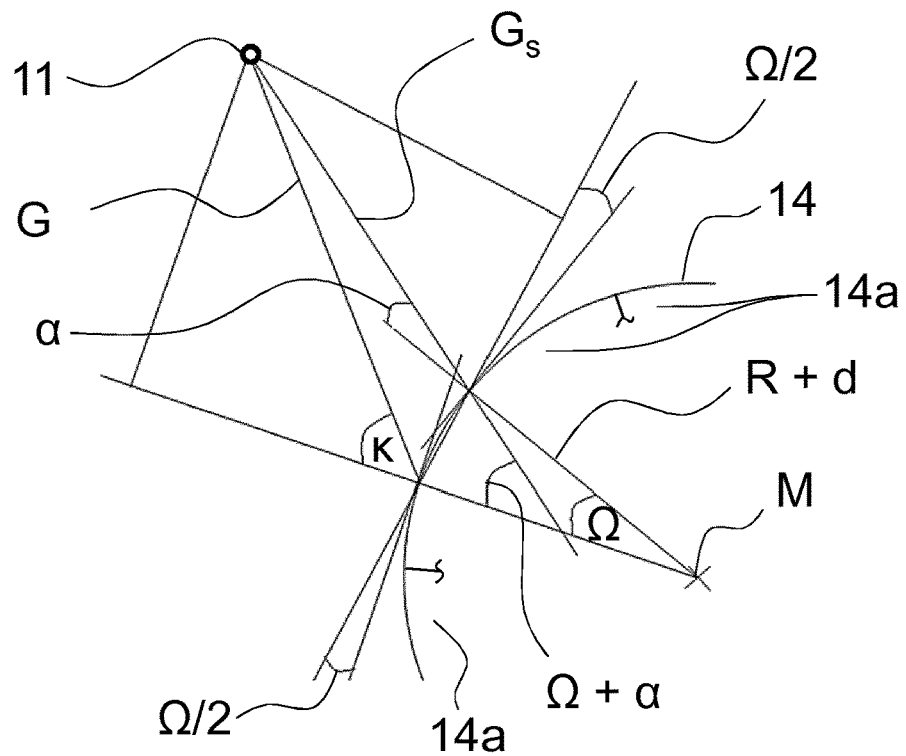
Figure 11:
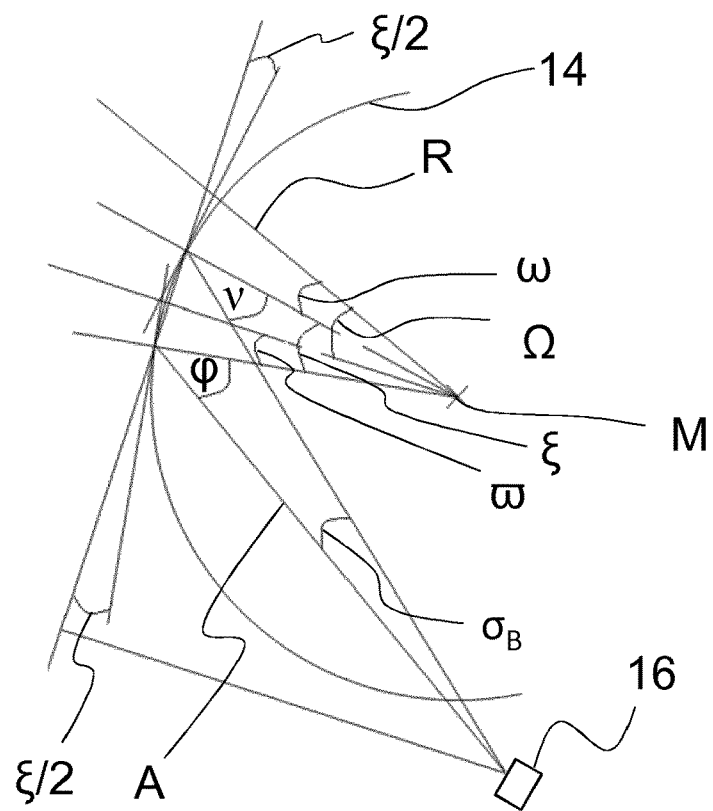
Figure 12:
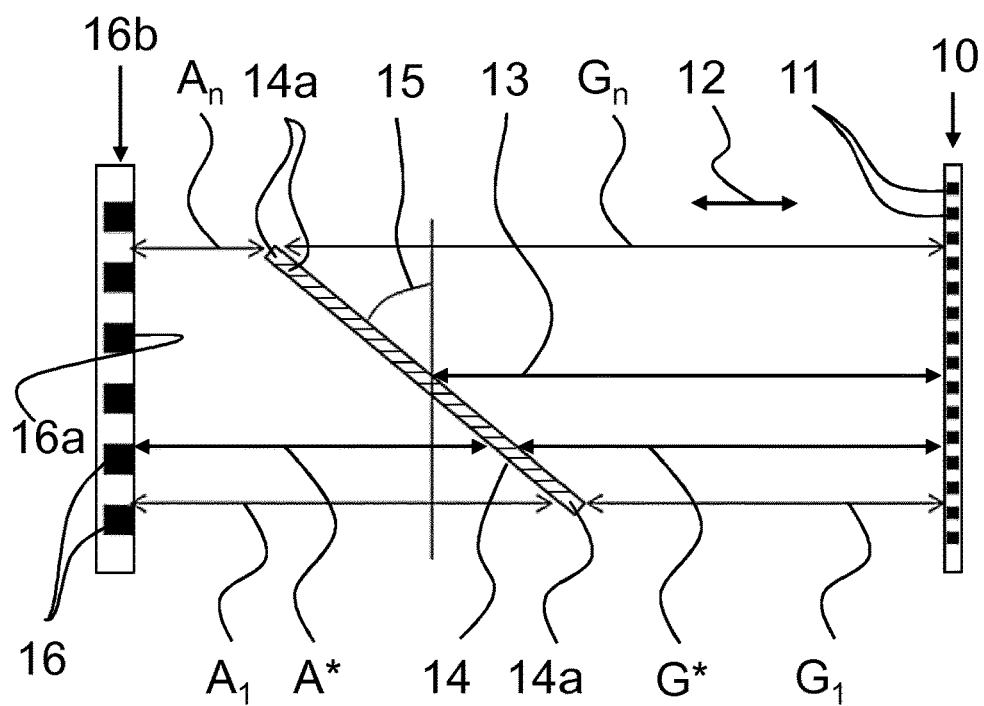

Illustrated schematically below are:

FIG. 1 A first embodiment of the device according to the invention for determining a secondary image angle of a light source on a transparent object in the form of a windscreen in a longitudinal section, FIG. 2, 2a The formation of an angle of vision through a single, illuminated volume element of a transparent object or a secondary image angle through the transparent object in cross-section, respectively, FIG. 3 The positions of a primary image and a secondary image of a single light source on a target in a front view, FIG. 4 Intensities of the primary and secondary images of six vertically arranged light sources from FIG. 1 when adjacent light sources have different light intensities, FIG. 5 A second embodiment of the device according to the invention in a longitudinal section, FIG. 6 An illuminating device in front view FIG. 7 Generation of an angle of vision through a single wedge-shaped, illuminated volume element of a transparent object in cross section, FIG. 8 Generation of an angle of vision similar to FIG. 7 under a second ambient parameter, FIG. 9-11 Generation of an angle of vision through a single curved, illuminated volume element of a transparent object in cross section, and FIG. 12 A third embodiment of the device according to the invention for determining a secondary image angle and/or angle of vision of a light source on a transparent object in the form of a windscreen in longitudinal section.

The embodiment of a device according to the invention illustrated in FIG. 1 comprises an illuminating device 10 with for example nine simultaneously illuminated, punctiform series of light sources 11 arranged vertically above each other, which are designed for example as LEDs. The illuminating device 10 is arranged on the first side of a transparent object in the form of a windscreen (hereinafter referred to as a pane) 14. A camera 16 is placed on the second side of the pane 14, which is opposite the first side. The pane 14 is placed in a horizontal direction 12 at a distance 13 of 7 m from the illuminating device 10 and arranged with an inclination angle 15 with regard to the vertical direction, whereby the inclination angle corresponds to the later installation position of the pane 14. Each light source 11 emits light in the direction of pane 14 and illuminates one volume element 14a of pane 14 each time. The target is formed by the recording surface 16a of camera 16. The camera 16 simultaneously captures the positions of a primary image 21a and a secondary image 21b (see FIG. 3) for each of the illuminating light sources. An optical filter 17 can be arranged in the light path in front of camera 16, wherein the filter transmits only one wavelength with which the light sources 11 shine. Disturbing light from other sources with different wavelengths will not be captured by the camera 16 in this case. An evaluation device 18 connected with camera 16 determines the secondary image angle and/or angle of vision of the illuminated volume element 14a of pane 14 by using the positions of the associated primary and secondary image 21a, 21b, as described below, simultaneously for all volume elements 14a illuminated by the illuminating device 10.

Alternatively the illuminating device 10 in FIG. 1 may have twelve light sources 11 vertically juxtaposed (for example at a distance of 4.5 mm), wherein the light sources can be switched on and off separately. To explain a sample switching pattern, the status of each light source is marked with "1" for switched on status and with "0" for switched off status. In the first step, every fourth light source 11 is switched on when viewed from top to bottom (first switching pattern: 100010001000). In the second step, the light sources switched on in the first step are switched off and the light sources below are switched on (second switching pattern: 010001000100). This is followed analogously by the third step with a switching status which corresponds to a third switching pattern 001000100010 and a fourth switching status which corresponds to a fourth switching pattern 000100010001. Thus, the secondary image angle/angle of vision for each individual volume element can be determined in a total of four steps with all light sources 11 of the illuminating device 10, without any difficulties in the allocation of primary and secondary images 21a, 21b for adjacent light sources 11 due to high light source density (see FIG. 2).

Illuminating devices 10 with another number and/or distribution of light sources 11 are also possible.

FIG. 2 shows a single volume element 14a of the pane 14 from FIG. 1, which is illuminated from a single light source 11 from FIG. 1. A light beam from the light source 11 falls on the illuminated volume element 14a at an angle of incidence κ with regard to the surface normal. A portion of the light from light source 11 follows a primary light path 19a and passes through the volume element 14a without being reflected. Another portion of the light from light source 11 follows a secondary light path 19b and passes through the volume element 14a being reflected at the second interface of pane 14. On the second side of the volume element 14a, which corresponds to the second side of pane 14 from FIG. 1, the primary light path 19a and secondary light path 19b form an angle of vision σ. Pane 14 is a flat, i.e. not curved, pane with a wedge. This means that the front and rear sides of the pane 14 in the area of illuminated volume element 14a do not run parallel to each other but form a wedge angle η.

FIG. 2a shows the formation of the secondary image angle ρ by the primary light path 19a and the secondary light path 19b of an incident beam 19 through pane 14. For the secondary image angle ρ:

$$\rho = 2\eta \left( \frac{\sqrt{n^2 - \sin^2 \kappa}}{\cos \kappa} \right) \tag{F1}$$

Here n is the refractive index of the material of pane 14, κ is the angle of incidence of the incident beam 19, and n is the wedge angle of pane 14.

FIG. 3 shows a section of the target 16a of camera 16 from FIG. 1. For example, the positions of a primary image 21a and a secondary image 21b of a single light source 11 are shown. Based on a vertical distance 22 and a horizontal distance 23 of the positions of the primary image 21a and secondary image 21b on target 16a, the evaluation device 18 in FIG. 1 can determine the secondary image angle ρ and/or angle of vision σ for the volume element 14a of pane 14 from FIG. 11, which is illuminated by the light source 11. Alternatively, the absolute horizontal and vertical positions of the primary image 21a and secondary image 21b can be determined in a two-dimensional coordinate system of target 16a. A length of the light path from light source 11 to target 16a is known. The vertical distance 22 is calculated from the vertical pixel number Pv determined by camera 16. By using a proportionality factor Fv, which includes a pixel distance and magnification scale of camera 16 in the vertical direction, a vertical component ρv=arctan(Pv*Fv/E) of the secondary image angle ρ is determined taking the distance E between the target 16a and the pane into consideration. The calculation of a horizontal component of the secondary image angle ρh is done analogously on the basis of a horizontal pixel number Ph. Likewise, a primary and secondary image is captured for each additional light source 11 and the secondary image angle is determined with both components ρv and ρh. The same can be done with regard to the angle of vision σ.

For example, a diagram in FIG. 4 shows the intensities on the target of the primary and secondary images of six light sources 11 from FIG. 1 arranged next to each other, whereby two adjacent light sources 11 each have different light intensities. The intensity is plotted on vertical axis 40. The light sources 11 with a higher light intensity generate primary images with high primary image intensity 41a and the light sources 11 with a lower light intensity generate primary images with a lower primary image intensity 42a. Accordingly, the secondary images of light sources 11 with a higher light intensity also show a higher secondary image intensity 14b than the light sources 11 with a lower light intensity. The primary and secondary images can be assigned to each other by using different light intensities.

FIG. 5 shows a second embodiment of the device according to the invention. In contrast to the first embodiment shown in FIG. 1, this design has a first mirror 50 and a second mirror 51 in the light path between the illuminating device 10 and pane 14. The illuminating device 10, the first mirror 50, and the second mirror 51 are arranged together in an enclosure 52. The light path between the illuminating device 10 and transparent object 14 is folded twice through the first mirror 50 and second mirror 51. The space requirement 53 on the front side of pane 14 for the apparatus may thereby be reduced significantly. By using a double fold, a light path of more than 7 m length between the illuminating device 10 and pane 14 can be realized with a space requirement 53 of only 2.5 m.

FIG. 6 shows another design option for an illuminating device 10a. It has multiple horizontally arranged light strips 10b, whereby each light strip 10b has multiple vertically juxtaposed light sources 11, with a uniform light source distance 11v. The vertical light source distance 11v in this embodiment is larger than the horizontal light source distance 11h, which corresponds to the distance of two adjacent light strips 10b. Two adjacent light sources 11, i.e. arranged next to or below each other, preferentially illuminate in different colors and/or intensities and/or polarizations. Two adjacent light strips 10b are shifted vertically by a distance that is smaller than the vertical light source distance 11v to achieve a higher light source density in the vertical direction. Due to the horizontal distance of the light strips 10b, the illuminating device 10a from FIG. 6 is also suitable for determining the horizontal component of the secondary image angle.

FIG. 7 explains the formation of an angle of vision at a wedge-shaped volume element 14a from a primary image 71a and a secondary image 71b of light source 11 on target 16a. Light on a primary light path at an illuminating distance G from light source 11 falls on the front side of the volume element 14a at an angle of incidence κ and is refracted due to the refractive index n of the volume element 14a so that it passes through the volume element 14a at an angle A to the normal on the front side of volume element 14a. Then, it leaves on the rear side at an exit angle ν to the normal on to the rear side, passes through an aperture 70 at a sight distance A and generates the primary image 71a on target 16a. On a secondary light path (shown as dotted), light of the same light source 11 falls on the front side at another angle of incidence α, is refracted at an angle β, reflected twice in volume element 14a, and then leaves on its rear side at an exit angle φ. It then passes through aperture 70 and generates a secondary image 71b on target 16a. On the second side of the volume element 14a, i.e. between its rear side and target 16a, the primary and secondary light paths run at an angle of vision $\sigma_\eta$.

As an approximation, it is assumed that the thickness of the volume element 14a is constant in spite of wedge angle η. In addition, it is assumed that σ and η are small angles. Thus, the primary and secondary light paths pass through aperture 70 and the following equations are generally applicable for a wedge-shaped transparent object:

$$\sin \theta = \sin \kappa - \eta \sqrt{n^2 - \sin^2 \kappa} \tag{F2}$$

$$\sin \varphi = \sin \alpha - 3\eta \sqrt{n^2 - \sin^2 \alpha} \tag{F3}$$

$$G\cos\kappa(tg\alpha-tg\kappa)+d[2tg(\beta-2\eta)+tg\beta-tg\lambda]-A\cos(\theta+\eta)[tg(\zeta+\eta)-tg(\varphi+\eta)]=0 \quad (F4)$$

$$\sigma_\eta=\nu-\varphi \quad (F5)$$

The angle of vision $\sigma_n$ of the same volume element 14a can be different for different ambient parameters or configurations (illuminating distance G, viewing distance A, angle of incidence κ).

Instead, the angles of vision $\sigma_\eta$ for different volume elements 14a each under first ambient conditions (i.e. for first configuration) which differ from the reference parameters are determined, and the angle of vision $\sigma_\eta^*$, formed under the reference parameters (reference viewing distance A*, reference illuminating distance G*, reference angle of incidence k*) is calculated (cf. FIGS. 7 and 8). For example, the angle of vision can be determined for other parameters (i.e. for a configuration deviating from the norm), e.g. a viewing distance of 4 m, and the angle of vision supported by the standard and/or secondary image angle can be calculated for a reference viewing distance of 7 m. Subsequently the angle of vision and/or the secondary image is calculated for the reference or standard configuration.

The calculation of the angle of vision is made on the basis that the illuminating distance G, angle of incidence κ, thickness d, wedge angle η, viewing distance A are known, and the angle of vision $\sigma_\eta$ is measured. Now the angle of incidence α is changed in the equation system with formulas (F2) to (F5) and the equation system is solved with an iterative process (for example MS Solver).

Alternatively, if the illumination distance G, angle of incidence α, angle of incidence κ, thickness d and viewing distance A as well as angle of vision $\sigma_\eta$ are known, the wedge angle η can be determined by using the equation system with formula (F2) to (F5) of the tested volume element. A starting value or approximation value of the wedge angle η is obtained by adjusting formula (F1) if the measured angle of vision $\sigma_\eta$ is used instead of the secondary image angle ρ. The wedge angle η is then changed until the measured angle of vision $\sigma_\eta$ is reproduced in formula (F5). With wedge angle η and by solving the above equation system, an angle of vision $\sigma_\eta^*$ is determined for a second ambient parameter. Furthermore, wedge angle η and angle of incidence κ with formula (F1) can be used to calculate the associated (independent of A and G) secondary image angle ρ for volume element.

Since the equation system has four equations, known numeric methods can be used in many cases to find solutions for multiple unknown values, especially for wedge angle η and angle of incidence α.

FIG. 9 to 11 illustrate a curved transparent object (pane) 14 without a wedge (i.e. η=0) in which an angle of vision $\sigma_B$ of the volume element 14a is caused by the bending radius R. For better clarity, the primary and secondary light paths are shown in FIG. 10 only up to the front side of the volume element 14a and in FIG. 11 only from the rear side of the volume element 14a up to target 16a. In the area of the volume element 14a, pane 14 has a bending radius R on the rear side and a bending radius R+d on the front side, whereby d is the thickness of the pane in the area of volume element 14a. The bending radius R and thickness d are known in most cases, in contrast to possible wedge angles. On the primary light path, the light from the light source 11 at illuminating distance G and angle of incidence κ falls on the front side of the volume element 14a, and on the secondary light path at illuminating distance $G_S$ and angle of incidence α. With regard to the center of curvature M of the volume element 14a, the point of impact of light of the primary and secondary light paths is separated on the front side by an angle Ω.

The light of the primary light path passes through the volume element 14a only once and leaves it at its rear side at an exit angle φ. The light of the secondary light path, in contrast, is reflected first at the rear side, then at the front side of the volume element 14a, and only then leaves it at the rear side at an exit angle ν. As is evident in FIG. 11, the exit points of the primary and secondary light paths are separated on the rear by an angle of ξ with reference to the center of curvature M. The light of the primary light path falls on the target 16 coming from the rear side of the volume element 14 at a viewing distance A. The light of the secondary light path also falls on target 16a coming from the rear side. The primary light path and secondary light path run after leaving the volume element 14a at an angle of vision $\sigma_B$, which is determined by the curvature or bending radius R of the volume element and thickness d of the volume element.

The following equation system is applicable for the situation shown in FIG. 9 to 11:

$$\sin\varphi = \frac{R+d}{R}\sin\kappa \quad (F6)$$

$$\sin\nu = \frac{R+d}{R}\sin\alpha \quad (F7)$$

$$\Omega = \frac{G\sin(\kappa-\alpha)}{(R+d)\cos\alpha + G\cos(\kappa-\alpha)} \quad (F8)$$

$$\omega = \frac{3d}{R}\frac{\sin\alpha}{\sqrt{n^2-\sin^2\alpha}} \quad (F9)$$

$$\varpi = \frac{d}{R}\frac{\sin\kappa}{\sqrt{n^2-\sin^2\kappa}} \quad (F10)$$

$$\xi = \Omega - \omega + \varpi \quad (F11)$$

$$\sigma_B = \nu - \varphi + \xi \quad (F12)$$

$$G\cos\left(\kappa-\frac{\Omega}{2}\right)\sin\frac{\xi}{2}\left[\tan\left(\kappa-\frac{\Omega}{2}\right)-\tan\left(\alpha+\frac{\Omega}{2}\right)\right]-2d\sin\frac{\Omega}{2}\sin\frac{\xi}{2} = \quad (F13)$$
$$A\cos\left(\varphi-\frac{\xi}{2}\right)\sin\frac{\Omega}{2}\left[\tan\left(\nu+\frac{\xi}{2}\right)-\tan\left(\varphi-\frac{\xi}{2}\right)\right]$$

In particular, with known measuring arrangements and in the absence of a wedge error (η=0) in a volume element 14a, the bending radius R can be determined based on the measured angle of vision $\sigma_B$. For this purpose, the above equation system is solved with formulas (F6) to (F13) through known numeric solution methods by varying a.

Even the angle of vision $\sigma_B$ generated by the bending radius R generally depends on the ambient parameters. In particular, with known radius R the above equation system can be used to calculate an angle of vision $\sigma_B^*$ under a second ambient parameter, for example, with a desired viewing distance A.

The aforementioned method is used separately and simultaneously for each volume element 14a of multiple volume elements illuminated by the illuminating device. The angle of vision and/or the secondary image angle for all volume elements 14 of a large area of pane 14 can be calculated simultaneously and for the entire pane 14 if required.

The third embodiment of the device according to the invention shown in FIG. 12 differs from the apparatus shown in FIG. 1 in that the target 16a is formed from the recording surfaces/image sensors of multiple cameras 16, which are arranged in camera line 16b. The illuminating device 10 is designed as an LED strip with light sources 11 arranged one above the other. As shown in FIG. 1, the flat pane 14 is inclined at an inclination angle 15 and arranged in the horizontal direction 12 at a distance 13 from the illuminating device 10. Due to the inclination angle 15, the individual light sources 11 of the illuminating device 10 have different horizontal illuminating distances G. An illuminating distance G, between one of the lowest light sources 11 and lowest volume elements 14a is less than the illuminating distance $G_n$ between the uppermost light source 11 and the uppermost volume element 14a and less than distance 13. Conversely, viewing distance $A_1$ is greater than viewing distance $A_n$. The apertures are available through a camera opening of camera 16 not shown in detail. For each volume element 14a, the above method is used to calculate, by means of a measured first angle of vision, a second angle of vision σ* (not shown) for reference conditions, i.e. a common reference illuminating distance G* and reference viewing distance A*. The reference illuminating distance should preferentially be G*=7 m.

The measured angle of vision σ of a volume element 14a for a first ambient parameter (e.g. G=5 m) is often produced by a wedge angle η as shown in FIG. 7 and by the bending radius R as shown in FIG. 9 to 11. If second angles of vision σ* with a specified second ambient parameter (e.g. G*=100 m) for the volume element 14a of a curved pane 14 have to be determined using the apparatus from FIG. 12, the angle of vision $\sigma_B$ caused by its bending radius R and thickness d is first calculated for each volume element 14a using the method described above and subtracted from the measured first angle of vision σ ($\sigma_\eta=\sigma-\sigma_B$). Here the bending radii R of the volume elements 14a over the pane 14 may vary. The result of subtraction corresponds to the angle of vision $\sigma_\eta$ for the respective volume element 14a, as it is assumed that a non-zero value of $\sigma_\eta$ is caused by the wedge angle η present in this volume element. If pane 14, as shown in FIG. 12, does not have any bending ($\sigma_B=0$), the measured first angle of vision σ corresponds to the angle of vision $\sigma_\eta$ of the wedge in accordance with FIG. 7.

The above mentioned distance G*=100 m is interesting in practice if the light source comes from that distance. In order to determine the angle of vision σ* for this situation from the value a determined with G=5 m, the angle of vision $\sigma_\eta$* for the ambient parameter G*=100 m is calculated for each volume element 14a from $\sigma_\eta$, as described with regard to FIGS. 7 and 8 (other ambient parameters remain unchanged). Then, if applicable, the angle of vision $\sigma_B$* caused by a bending radius R and thickness d of the volume element 14a for this ambient parameter as described above is calculated for each volume element 14a from $\sigma_B$ and added to $\sigma_\eta$* so that a second angle of vision σ* is calculated under a second ambient parameter for each volume element 14a as:

$$\sigma^*=\sigma_B^*+\sigma_\eta^* \tag{F12}$$

If the volume element 14a does not show a bending radius R, then $\sigma^*=\sigma_\eta^*$ is applicable for the second angle of vision.

Alternatively, the second angle of vision σ* for the reference ambient parameter G*=7 defined in a standard can also be calculated from the measured angle of vision σ. One such standard is the Regulation No. 43 of the United Nations Economic Commission for Europe (UNECE) mentioned at the beginning. In addition, the associated secondary image angle ρ can be calculated for each volume element 14a with known or calculated values for the angle of incidence κ and wedge angle η by using formula (F1).

The described method with an arrangement as shown in FIG. 12 allows, in spite of the inclination angle 15 of the pane, for different illuminating distances $G_1$ to $G_n$ as well as different viewing distances $A_1$ to $A_n$, the first angle of vision of all volume elements 14a to be measured simultaneously for known first ambient parameters and then to calculate the second angle of vision σ* for each volume element for second ambient parameters. This results in major time saving when determining the viewing and/or secondary image angle because otherwise the volume element has to be brought into the status of second ambient parameter through corresponding movement.

REFERENCE SIGN LIST 10, 10a Illuminating device
10b Light strip
11 Light source
11h Horizontal light source distance
11v Vertical light source distance
12 Horizontal direction
13 Distance
14 Pane
14a Volume element
15 Inclination angle
16 Camera
16a Target
16b Camera line
17 Optical filter
18 Evaluation device
19 Incident beam
19a Primary light path
19b Secondary light path
21a, 71a Primary image
21b, 71b Secondary image
22 Vertical distance
23 Horizontal distance
40 Vertical axis
41a, 42a Primary image intensity
41b, 42b Secondary image intensity
50 First mirror
51 Second mirror
52 Enclosure
53 Space requirement
70 Aperture
α, κ, κ* Angle of incidence
β, λ, ξ, $\bar{\omega}$, Ω Angle
ν, φ Exit angle
σ, $\sigma_\eta$, $\sigma_\eta$*, $\sigma_B$, Angle of vision
η Wedge angle
ρ Secondary image angle
A, $A_1$, $A_n$, A* Viewing distance
d Thickness
G, $G_S$, $G_1$, $G_n$, G* Illumination distance
M Center of curvature
R Bending radius

The invention claimed is:
1. An apparatus to determine an angle of vision (σ) of a light source on a transparent object:
   an illuminating device, which has multiple, partially simultaneously illuminated, punctiform light sources, whereby the light sources have an illuminating distance (G) from the transparent object, are located in front of the transparent object and the light of the light sources falls on the transparent object at an angle of incidence (κ) with regard to a surface normal;

at least one camera, which is set up to capture simultaneously the positions of a primary image and a secondary image of multiple, simultaneously illuminated light sources on a 2-dimensional target, whereby the target has a viewing distance (A) from the transparent object, is arranged behind the transparent object along a light path and is formed by a recording surface or image sensor of the at least one camera, whereby the primary image and the secondary image of each light source are generated by a volume element of the transparent object illuminated by the light source on the target; and an evaluation unit, which is set up to determine the angle of vision ($\sigma$) of the respective volume element of the transparent object based on the positions of the primary image and the secondary image as well as based on the viewing distance (A), the angle of incidence ($\kappa$) and the illuminating distance (G) whereby the angle of vision ($\sigma$) is the angle at which the at least one camera perceives the primary image and the secondary image of the light source.

2. The apparatus of claim 1, wherein the evaluation unit is further set up for at least one volume element of the transparent object, to determine a second angle of vision ($\sigma^*$) for a second configuration, which is different from a first configuration with regard to a second viewing distance (A*), a second angle of incidence ($\kappa^*$), and/or a second illuminating distance (G*), based on the angle of vision ($\sigma$) determined with the first configuration with the viewing distance (A), the incidence angle ($\kappa$), and the illuminating distance (G).

3. The apparatus according to claim 1, characterized in that the light sources of the illuminating device can be switched on and off separately so that there is sequential recording of the primary and secondary images of all light sources, whereby in each step a subset of multiple light sources is switched on simultaneously and another subset is switched off at the same time.

4. The apparatus according to claim 1, characterized in that the camera only captures the vertical component of the position of the primary image and the secondary image of each light source, and the evaluation unit only uses the captured vertical positions for determining the angle of vision ($\sigma$).

5. The apparatus according to claim 1, characterized in that adjacent light sources of the illuminating device can be controlled such that they have different light intensity and/or color.

6. The apparatus according to claim 2, characterized in that for at least one subset of two adjacent light sources one light source is switched on and the other light source is switched off at the same time.

7. The apparatus according to claim 1, characterized in that the evaluation unit is further set up to calculate for at least one volume element of the transparent object a secondary image angle ($\rho$) for the respective volume element using the angle of vision ($\sigma$).

8. A method to determine the angle of vision ($\sigma$) of a light source on a transparent object, the method comprising:

whereby the transparent object is illuminated by an illuminating device with multiple, simultaneously illuminated, punctiform light sources, whereby the light sources have an illuminating distance (G) from the transparent object, are located in front of the transparent object and the light of the light sources falls on the transparent object at an angle of incidence ($\kappa$) with regard to a surface normal, whereby the positions of a primary image and a secondary image of multiple simultaneously illuminated light sources are captured by at least one camera on a two-dimensional target at the same time, whereby the target has a viewing distance (A) from the transparent object, is arranged behind the transparent object along a light path and is formed by a recording surface or image sensor of the at least one camera, whereby the primary image and the secondary image of each light source are generated on the target through a volume element of the transparent object illuminated by the respective light source, and whereby by means of an evaluation unit the angle of vision ($\sigma$) of the respective volume element of the transparent object based on the positions of the primary image and the secondary image as well as based on the viewing distance (A), the angle of incidence ($\kappa$) and the illuminating distance (G) is determined, whereby the angle of vision ($\sigma$) is the angle at which the at least one camera perceives the primary image and the secondary image of the light source.

9. The method according to claim 8, whereby for at least one volume element of the transparent object a second angle of vision ($\sigma^*$) is determined for a second configuration, which is different from a first configuration with regard to a second viewing distance (A*), a second angle of incidence ($\kappa^*$), and/or a second illuminating distance (G*), based on the angle of vision ($\sigma$) determined with the first configuration with the viewing distance (A), the incidence angle ($\kappa$), and the illuminating distance (G).

10. The method according to claim 9, characterized in that the determination of the second angle of vision ($\sigma^*$) of the second configuration includes the following steps when the first angle of vision ($\sigma$) was determined:

calculation of a wedge angle ($\eta$) for the respective volume element based on the first angle of vision ($\sigma$), and calculation of the second angle of vision ($\sigma^*$) by using the calculated wedge angle ($\eta$).

11. The method according to claim 8, characterized in that the light sources of the illuminating device can be switched on and off separately so that there is sequential recording of the primary and secondary images of all light sources, whereby in each step a subset of multiple light sources is switched on simultaneously and another subset is switched off at the same time.

12. The method according to claim 11, characterized in that for at least one subset of two adjacent light sources one light source is switched on and the other light source is switched off at the same time.

13. The method based on claim 8, characterized in that the camera only captures the vertical components of the position of the primary image and the secondary image of each light source and the evaluation unit only uses the captured vertical positions for determining the angle of vision ($\sigma$).

14. The method based on claim 8, characterized in that the adjacent light sources of the illuminating device can be controlled such that they have a different light intensity and/or color.

15. The method according to claim 8, characterized in that the transparent object is moved relative to the illuminating device and the target when determining the angle of vision ($\sigma$).

16. The method according to claim 8, characterized in that a fraction of the angle of vision ($\sigma$) caused by a bending radius (R) and a thickness (d) of the transparent object in the respective volume element is determined.

17. The method according to claim 8, characterized in that a fraction of the angle of vision ($\sigma$) caused by a wedge angle ($\eta$) in the respective volume element of the transparent object is determined.

18. The method according to claim 8, characterized in that a secondary image angle ($\rho$) for the respective volume element is calculated for at least one volume element of the transparent object using the angle of vision ($\sigma$).

* * * * *